Sept. 8, 1964     R. J. ROSA     3,148,291
ELECTRICAL GENERATOR
Filed May 31, 1960

RICHARD J. ROSA
INVENTOR.

BY
ATTORNEYS

United States Patent Office 3,148,291
Patented Sept. 8, 1964

3,148,291
ELECTRICAL GENERATOR
Richard J. Rosa, Reading, Mass., assignor to Avco Corporation, Cincinnati, Ohio, a corporation of Delaware
Filed May 31, 1960, Ser. No. 32,969
13 Claims. (Cl. 310—11)

The present invention relates to an electrical generator and more particularly to one that is adapted to generate large amounts of power at high voltage. For convenience, the invention is described with particular reference to magnetohydrodynamic (hereinafter abbreviated "MHD") generators but is not limited to such applications.

In general terms, MHD generators produce electric power by movement of electrically conductive fluid relative to a magnetic field. The fluid employed is usually an electrically conductive gas from a high temperature, high pressure source. From the source, the fluid flows through the generator and, by virtue of its movement relative to the magnetic field, induces an electromotive force between opposed electrodes within the generator. The gas may exhaust to a sink, which may simply be the atmosphere; or, in more sophisticated systems, the gas may exhaust to a recovery system including pumping means venience, may be termed "plasma."

Several different gases may be used; for instance, the gas may simply be air, or may comprise inert gases, such as helium or argon. To promote electrical conductivity, the gases may be heated to high temperature and may be seeded with a substance that ionizes readily at the operating temperature of the generator. For seeding purposes, sodium, potassium, cesium, or another alkali metal vapor may be used. Regardless of the gas used, and the manner of seeding, the resulting gases comprise a mixture of electrons, positive ions, and neutral atoms which, for convenience, may be termed "plasma".

The preferred embodiment of the present invention comprises a magnetohydrodynamic generator including opposed sets of discrete electrodes which are associated with terminal electrodes that are connected to a load circuit. Certain of the opposed electrodes are electrically interconnected and the terminal electrodes are selectively positioned along planes of equal potential within the generator so that the power output from the entire generator is delivered to a single load circuit. By use of discrete electrodes circulation of Hall current within the generator is prevented. The generator takes advantage of the Hall field, however, to generate large amounts of power at high voltage.

From the foregoing, it will be understood that an important object of the invention is to provide an improved electric generator.

Another object of the invention is to provide a generator that is capable of producing power at high voltage.

Still another object of the invention is to provide an MHD generator having opposed sets of electrodes that are interconnected in such fashion that the output from the generator represents the aggregate output of the individual sets of electrodes.

Another object of the invention is to provide an MHD generator for providing power at high potential to a single load thereby eliminating the need for auxiliary equipment for adding the power output of specific portions of the generator.

A specific object of the invention is to provide an MHD generator having terminal electrodes lying in a plane at an angle to the direction of fluid flow past the electrodes.

Still another object of the invention is the provision of an MHD generator in which eddy current losses are minimized.

Yet another object of the invention is the provision of an MHD generator in which the magnetic field of the generator is contoured and selectively positioned relative to equipotential planes within the generator.

The novel features that I consider characteristic of my invention are set forth in the appended claims; the invention, itself, however, both as to its organization and method of operation, together with additional objects and advantages thereof, will best be understood from the following description of specific embodiments when read in conjunction with the accompanying drawings, in which:

Figure 1:
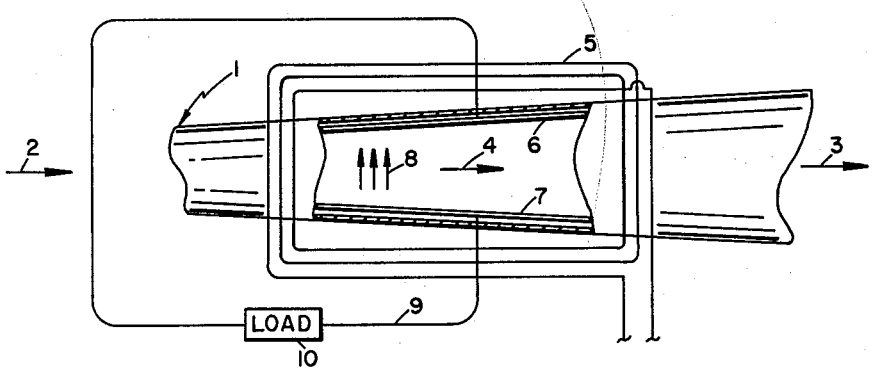
FIGURE 1 is a schematic representation of an MHD generator.

A knowledge of the general principles of MHD generators will promote an understanding of the present invention. For this reason, there is shown in FIGURE 1 a schematic of such a generator. As illustrated in that figure, the generator comprises a tapered duct, generally designated 1, to which high temperature, high pressure, electrically conductive plasma is introduced, as indicated by the arrow at 2, and from which it exhausts, as indicated by the arrow at 3. The pressure at the exit of the duct is lower than at its inlet; and for this reason, the plasma moves at high velocity through the duct, as indicated by the arrow at 4. By properly choosing the pressure differential and the shape of the duct, the plasma can be made to move through the duct at substantially constant velocity which is desirable, although not necessary, to the operation of the generator. Surrounding the exterior of the duct is a continuous electrical conductor in the form of a coil 5 to which a unidirectional electrical current may be supplied from any conventional source or from the generator itself. Flow of electrical current through the coil establishes a magnetic flux through the duct, perpendicular to the direction of plasma flow and the plane of the paper.

Within the duct are provided opposed spaced electrodes 6 and 7. These electrodes may extend along the interior of the duct parallel to the direction of plasma movement and may be positioned opposite one another with their separation perpendicular to both the direction of plasma movement and the magnetic flux. High velocity movement of the electrically conductive plasma through the magnetic field induces a unidirectional E.M.F. between the electrodes, such as indicated by the arrows at 8. The electrodes 6 and 7 are connected by conductor 9 to a load 10 through which electrical current flows under the influence of the E.M.F. induced between the electrodes.

Since electrons are lighter than ions and hence have a higher mobility, they will, in general, carry most of the current in an MHD generator. Since the forces exerted by the magnetic field are exerted on the current carriers, the electrons naturally experience most of the forces arising from their movement in the field.

The electron current, induced between the electrodes, is proportional to the cross product of the velocity of the plasma and the magnetic field. The magnetic field acts on the current, creating a force tending to retard motion of the electrons longitudinally down the duct with the rest of the plasma. The ions, on the other hand, being much greater in mass than the electrons, only experience small forces as they move in the magnetic field and tend to be carried downstream with the plasma. Thus, a separation of charges occurs, resulting in the creation of an electric field longitudinally of the duct. This longitudinal field is frequently called the "Hall field" since the phenomena involved are similar to those giving rise to the so-called "Hall effect" observed some time ago in solid conductors. The potential, associated with the "Hall field," may be called the "Hall potential."

The forces, acting on the electrons, are transmitted by them to the rest of the plasma particles by collosions. Further, the movement of plasma particles is retarded by collision with the ions which, although carried downstream with the rest of the plasma, are held by the electric field existing between them and the upstream electrons. In overcoming the forces resulting from collisions with the ions and electrons, the plasma does work, as would be expected in a device for generating power.

In an MHD generator of the type illustrated in FIGURE 1, the Hall potential promotes longitudinal circulation of current internally of the generator. This occurs because the Hall potential is shorted out through the electrodes. If such shorting is prevented, the Hall potential will build up to a finite value as equilibrium conditions are established within the generator. One way to prevent shorting is to avoid use of continuous electrodes, as by use of discrete electrically insulated electrodes, as will now be described with reference to FIGURE 2.

Directing attention to that figure, it will be noted that the generator comprises a duct, generally designated 20, to which high temperature, high pressure, electrically conductive plasma is introduced, as indicated by arrow 21, and from which it exhausts as indicated by the arrow 22. Adjacent the exterior of the duct is a continuous electrical conductor in the form of a coil 23 to which current may be supplied from any conventional source or from the generator itself. Flow of current in the coil provides a magnetic flux through the duct perpendicular to the plane of the paper. The form and disposition of the coil will be discussed in greater detail later in this specification.

Along the top and bottom of the duct are provided pluralities of discrete electrodes 30–45 and 50–65, respectively. Adjacent the entrance and exit of the duct are opposed pairs of terminal electrodes, one of each pair being shown at 70 and 71, respectively. These terminal electrodes are connected by conductor 72 to a load 73.

First, it should be noted that certain diagonally opposed electrodes are electrically interconnected. To illustrate, upper electrode 30 is electrically connected by conductor 74 to lower electrode 50. In similar fashion, electrodes 31 and 51 are interconnected, and similarly with respect to all of the electrodes through 45–65. It will be noted that the ends of each interconnected pair of electrodes lie within a plane at an angle to the stream of plasma flowing through the duct. The angular position of these planes and the angular positions of the terminal electrodes 70 and 71 will be discussed more fully later in the specification.

Figures 3, 4, 5:
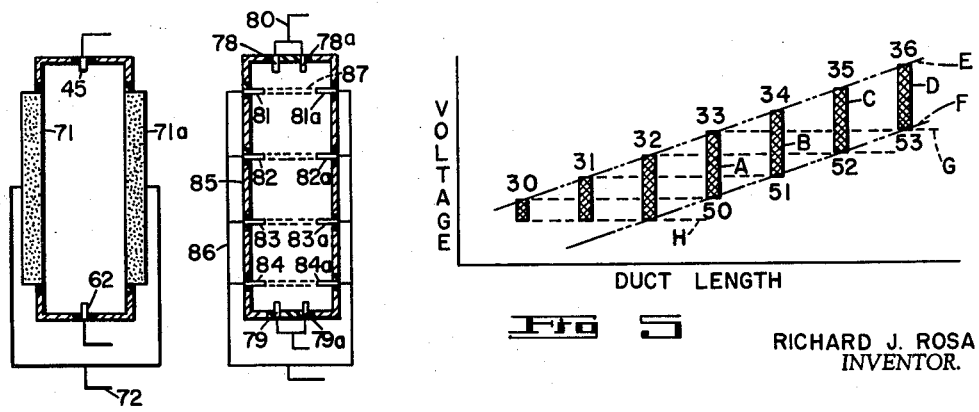
FIGURE 3 is a cross sectional view of the novel MHD generator taken on plane 3—3 of FIGURE 2.
FIGURE 4 shows a modification of the MHD generator of FIGURE 2 taken on a plane comparable to a plane 3—3.
FIGURE 5 is a graph illustrating voltage conditions within the novel MHD generator.

Directing attention to FIGURE 3, it will be noted that the duct may be generally rectangular in cross section and that the terminal electrode 71 is electrically interconnected with its opposed terminal electrode 71a in the opposite wall of the duct. As is the case with the electrodes 30–45 and 50–65, all of the terminal electrodes are electrically insulated from the duct.

Because of the Hall potential existing longitudinally of the duct, electrons from the plasma stream will enter terminal electrode 70 and its opposed terminal electrode (not illustrated), flow through the load circuit to the terminal electrodes 71 and 71a, and re-enter the plasma stream from these latter electrodes. Becasue of this electron movement, the upstream terminal electrodes may be regarded as anodes, and the downstream terminal electrodes as cathodes. The discrete electrodes 50–65 serve as anodes and electrodes 30–45 as cathodes. With regard to the discrete electrodes, electrons will be emitted by the electrodes (cathodes) 30–45 and will be received from the gas stream by electrodes (anodes) 50–65. Consistent with the foregoing designations, the magnetic field should be established perpendicular to the direction of plasma flow and perpendicularly into the plane of the paper. In accordance with customary notation, the magnetic field is designated in FIGURE 2 by the plus signs, indicating flux lines directed into the plane of the paper.

The electrodes may be made from many different materials, both metals and non-metals, such as graphite, copper, stainless steel, tungsten, etc. Depending upon the temperature of the plasma, the electrodes may be cooled, as by internal circulation of coolant (not shown). Generally speaking, the anodes are cooled below electron emitting temperatures, while the cathodes operate at a temperature sufficiently high to sustain continuous electron emission.

Movement of electrically conductive plasma past each pair of opposed electrodes generates a potential gradient in the plasma therebetween which is proportional to the cross product of the velocity of the gas and the magnetic field strength. Under the influence of this potential, an electron current flows between the electrodes. For purposes of illustration, but not by way of limitation, it may be assumed that the velocity of the plasma and the magnetic field strength remain constant throughout the length of the duct. Under such conditions, the potential difference established transverse of the duct between any given pair of opposed electrodes is substantially constant; however, because of the Hall potential existing longitudinally of the duct, the mean potential of the last pair of electrodes is at a more positive level than that of the first pair of electrodes. Thus, the mean potential of any given pair of opposed electrodes is more positive than the mean potential of opposed electrodes that are upstream thereof.

This is illustrated by FIGURE 5 which shows in graphical form the potential difference in the plasma stream existing between successive pairs of opposed electrodes. For convenience, the bar graph A shows the potential difference between electrodes 33 and 50, the potential associated with the electrodes being indicated by the reference numbers at the ends of the bar graph. Similarly, with respect to bar graphs B–D which illustrate the potential difference between opposed electrodes 34—51, 35—52, and 36—53. Although the potential difference between opposed electrodes is nearly constant, it will be noted that the potential of successive electrodes along each side of the duct increases positively from the inlet to the outlet. The horizontal spacing of the bar graphs indicates the spacing of the electrodes along the length of the duct. The potential gradients, illustrated by the phantom lines E and F extending along the upper and lower ends of the bar graphs, illustrate the Hall potential longitudinally of the duct.

By suitable spacing of the electrodes along the duct, it is possible to make the potential of the staggered, opposed electrodes the same. Thus, the potential of electrode 53 can be made the same as that of electrode 33. Since these electrodes are at the same potential, they may be electrically interconnected, as by conductor 33a. In like manner, the electrodes 34 and 54 may be interconnected by conductor 34a. Similarly all of the electrodes on the opposite sides of the duct are diagonally interconnected.

In the plasma stream within the duct, each plane in which lie electrically interconnected electrodes is a plane of constant potential. One such plane of constant potential is indicated by the dash line G in the graph of FIGURE 5. This line cuts across the various bar graphs A–D indicating that a constant value of potential exists at points between the sets of opposed electrodes related to the graphs. In the case of the bar graphs A and D, the electrodes 33 and 53 themselves are at the same constant potential, as has been mentioned. With respect to bar graphs B and C, the points of constant potential lie within the plasma intermediate the associated opposed electrodes.

It will be noted therefore, that a multiplicity of planes of constant potential exist along the length of the duct.

It will be understood then that the terminal electrodes 70 and 71, by virtue of the fact that they have angular dispositions with respect to the duct corresponding to those of electrically interconnected electrodes, will also lie along planes of constant potential. The potential level of terminal electrode 71, however, is above that of terminal electrode 70 because of the Hall potential existing longitudinally of the duct and the potential generated between opposed electrodes. By connecting the terminal electrodes to a load, as has been explained, this potential difference can be used to drive current through it.

The constant potential of terminal electrode 70 is designated by dash line H in FIGURE 5. The potential of electrodes 30, 31 and 32 is above potential level H and electrons from the discrete electrodes are delivered to the terminal electrode. It will be noted then that the power generated by each pair of opposed electrodes is added to the power of all other pairs of electrodes and supplied to the terminal electrodes. Thus, a generator of the type described not only is able to deliver power at high voltage, but substantial amounts of power to a common load. In other generators, having pluralities of electrodes, it is necessary to provide several load circuits in order to combine the power output of separate portions of the generators. This necessitates additional conductors and, if a single load is to be supplied, special circuits, such as voltage dividers and D.C. to A.C. conversion equipment, for combining the power and delivering it to a single load.

The vertical distance "$y$" relative to the spacing "$x$" between electrically connected electrodes may be determined from the following formula:

$$\frac{y}{x} = \omega\tau\frac{(1-\epsilon)}{\epsilon} \quad (1)$$

where $\omega$ = electron cyclotron frequency radians/second
$\tau$ = electron mean free time seconds
$\epsilon = E_y/uB$ = "electrical efficiency" of generator
$E_y$ = voltage gradient between opposed electrodes volts/meter
$u$ = macroscopic plasma velocity (meters/second)
$B$ = magnetic field strength (webers/meter$^2$)

Figure 2:
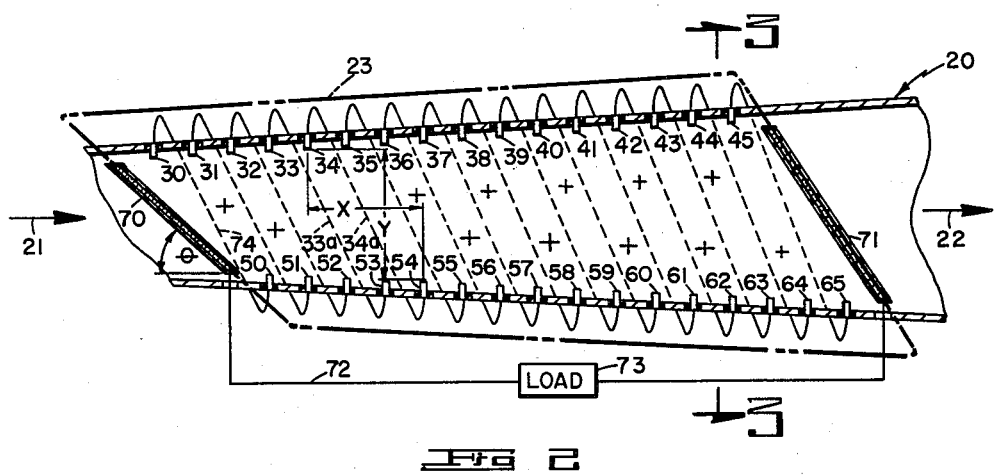
FIGURE 2 is a schematic longitudinal sectional view of an MHD generator embodying the novel principles of this invention.

The "$x$" and "$y$" dimensions are indicated in FIGURE 2. As $y$ increases because of the taper of the duct, the $x$ dimension necessarily increases proportionally; however, as indicated by FIGURE 2, the amount of increase is very slight. The field strength may be adjusted, if desired, to compensate for these dimensional changes whereby the potential differences between electrodes may be held substantially constant.

The angle $\theta$ of the terminal electrodes, which is also the angle of the planes of constant potential as has been described, may be determined from the following formula:

$$\theta = \text{tangent}^{-1}(y/x) \quad (2)$$

The angle $\theta$ is also indicated for convenience in FIGURE 2.

Returning to a consideration of FIGURE 2, it will be noted that the terminal electrode 70 follows the plane of constant potential lying between electrodes 30, 31 and 32, and the opposite side of the duct. It will also be noted, however, that no electrodes are provided on the opposite side of the duct since it is desired to terminate the generator action at the plane of the terminal electrode, and thus, no additional electrodes to the left of terminal electrode 70 are necessary. Similarly, no additional electrodes need be provided to the right of terminal electrode 71.

As is well known, eddy currents penalize the performance of any generator. In MHD generators, eddy currents increase the pressure drop across the generator that must be maintained for a given power output. It is desirable, therefore, to eliminate or minimize eddy current losses wherever possible. As illustrated in FIGURE 2, eddy currents at the inlet and the outlet of the generator can be minimized by limiting the magnetic field, insofar as possible, along the planes of equal potential of terminal electrodes 70 and 71. Thus, it will be noted in FIGURE 2, that the ends of the magnetic coil 23 are positioned at an angle, or contoured, to correspond in position to the terminal electrodes 70 and 71. In this way, no potential surfaces will be created that extend into a region outside the magnetic field (but within the plasma stream) and hence no electric field will exist in this region to cause the flow of eddy currents.

In FIGURE 3, single rows of electrodes are shown at the top and bottom of the generator duct. It will be understood, however, that instead of single rows of electrodes, several rows may be employed. This will improve operation of the generator, and accommodate flow of current more effectively across the entire width of the duct. Thus, in FIGURE 4, two rows of electrodes 78–78a and 79–79a are shown in the top and in the bottom of the duct. These may be connected in parallel since their output is combined and flows through a common conductor such as indicated at 80.

The terminal electrodes described with respect to FIGURES 2 and 3 are elongated electrically conductive bars mounted in the side walls of the generator duct, as specifically shown in FIGURE 3. Since a plane of constant potential exists across the entire width of the duct, however, is is possible to replace the electrode bars with a plurality of electrodes, as illustrated in FIGURE 4. Thus, in this figure, electrodes 81, 82, 83 and 84 are positioned in side wall 85 of the duct and are electrically interconnected by conductor 86. These electrodes extend into the plasma stream and lie along a plane of constant potential and together serve as a single terminal electrode. Similarly, individual electrodes 81a–84a may be provided in corresponding positions in the opposite wall of the duct and may be electrically interconnected as illustrated to serve as a single terminal electrode.

Extending between directly opposed individual electrodes 81 and 81a in FIGURE 4 are dash lines 87. These dash lines indicate that it is possible to use a continuous rod-type electrode extending fully across the width of the duct, serving the same purpose as the individual electrodes 81 and 81a. Electrodes, such as shown in FIGURE 4, projecting into the plasma stream provide a more direct flow path for current from the plasma; however, such electrodes impede plasma flow to some extent and are subject to erosion. Regardless of the form of terminal electrode employed, they are positioned in the duct to lie in planes of constant potential and serve to accommodate current flow from the generator to the load circuit.

From the foregoing description of a preferred embodiment of the invention, it will be understood that a novel form of MHD generator is disclosed that is adapted to produce large amounts of electric power at high potential. The generator is characterized by extreme simplicity, which inherently leads to reliability, and takes advantage of the Hall potential existing in such a generator. Thus, instead of the Hall potential hindering operation, it actually contributes to the effectiveness of the generator.

Having described a preferred embodiment of my invention, I claim:

1. An MHD generator for generating electricity from a moving stream of electrically conductive gas comprising a duct of rectangular cross section for conveying the gas stream, said duct having an inlet and an outlet, means for establishing a magnetic field through said duct normal to the direction of gas flow, terminal electrodes positioned in the side walls of said duct adjacent its inlet and outlet, said terminal electrodes being positioned at an angle to the direction of movement of the gas stream, and a plurality of discrete electrodes positioned at intervals along the top and bottom walls of said duct, certain of said discrete electrodes being directly opposed and lying in planes perpendicular to the direction of gas movement, opposed discrete electrodes lying in planes generally parallel to said terminal electrodes being electrically interconnected whereby movement of the gas stream relative to the discrete electrodes generates electricity which flows through the interconnections between said discrete electrodes and is delivered through the gas stream to said terminal electrodes.

2. Apparatus as defined in claim 1 in which said means for providing the magnetic field comprises an electrically conducting coil adjacent the exterior of the duct, portions of the coil corresponding in angular position and location to said terminal electrodes within said duct.

3. An MHD generator for generating electricity from a moving stream of electrically conductive gas comprising a duct of rectangular cross section for conveying the gas stream, said duct having an inlet and an outlet, means for establishing a magnetic field through said duct normal to the direction of gas flow, terminal electrodes in the side walls of said duct adjacent its inlet and outlet, and a plurality of discrete electrodes positioned at intervals along the top and bottom walls of said duct, certain of said electrodes being directly opposed and lying on axes perpendicular to both the direction of gas movement and the magnetic field in said duct, movement of gas past said discrete electrodes inducing a potential difference therebetween, the potential difference between each opposed pair of discrete electrodes being at a higher potential level than that of its immediately succeeding upstream pair of opposed electrodes, said opposed discrete electrodes being selectively interconnected to aggregate the potential difference induced between the individual pairs of electrodes, the movement of gas relative to the magnetic field also inducing a potential difference between said terminal electrodes and adjacent discrete electrodes.

4. Apparatus as defined in claim 3 in which said terminal electrodes are electrically conductive bars supported by said side walls and electrically insulated therefrom.

5. Apparatus as defined in claim 3 in which said terminal electrodes comprise electrically conductive members projecting from said side walls into the gas stream.

6. In combination in an MHD generator employing a moving stream of electrically conductive gas for generating electricity, a duct having an inlet and an outlet for conveying the gas stream, means for establishing a magnetic field through said duct normal to the direction of gas flow, discrete electrodes positioned in opposite walls of said duct on axes normal to both the direction of gas movement and the magnetic field through said duct, diagonally opposed electrodes being electrically interconnected, movement of gas through said duct relative to the field inducing flow of current between said opposed electrodes, and terminal electrodes at the inlet and outlet of said duct positioned in the sidewalls of said duct to receive current from adjacent discrete electrodes.

7. An MHD generator for generating electricity from a moving stream of electrically conductive gas comprising means for establishing a magnetic field transversely through the gas stream; terminal electrodes spaced from each other along the length of gas stream and inclined at an angle to the direction of its movement; and a plurality of discrete spaced electrodes aligned perpendicular to the direction of movement of the gas stream and the magnetic field, certain of said discrete electrodes, lying in planes at an angle to the direction of movement of the gas stream, being electrically interconnected.

8. Apparatus as defined in claim 7 in which said terminal and discrete electrodes lie in substantially parallel planes.

9. Apparatus as defined by claim 8 in which said terminal electrodes are continuous bars of electrically conductive material lying in planes parallel to the direction of gas movement.

10. Apparatus as defined in claim 8 in which said terminal electrodes comprise electrically conductive members extending into the gas stream transversely thereof.

11. A magnetohydrodynamic generator for generating electricity from a moving stream of electrically conductive gas comprising means for establishing magnetic flux through the gas stream, spaced terminal electrodes lying in planes parallel to the magnetic flux and inclined at an angle to the direction of gas movement and electrically interconnected discrete electrodes lying in planes parallel to the flux and inclined at an angle to the gas movement, said discrete electrodes lying on axes perpendicular to the flux.

12. Apparatus as defined in claim 11 in which the magnetic field is concentrated in the region between said terminal electrodes.

13. In combination in a magnetohydrodynamic generator for generating electricity from a moving stream of electrically conductive gas, means for establishing magnetic flux through the gas at an angle thereto, electrode means in communication with the gas stream for conducting electricity generated by the movement of the gas stream relative to the field, and terminal electrode means disposed adjacent said electrode means for receiving from said electrode means the aggregate electricity generated by movement of the stream relative to the field, said terminal electrode means lying in planes substantially transverse of and inclined at an angle to the direction of gas movement.

References Cited in the file of this patent

FOREIGN PATENTS 841,613    Germany _____ June 16, 1952

UNITED STATES PATENT OFFICE
CERTIFICATE OF CORRECTION

Patent No. 3,148,291                            September 8, 1964

Richard J. Rosa

It is hereby certified that error appears in the above numbered patent requiring correction and that the said Letters Patent should read as corrected below.

Column 1, line 26, for 'venience, may be termed "plasma."' read -- for returning the gas to the source. --; column 3, line 10, for "collosions." read -- collisions. --.

Signed and sealed this 19th day of January 1965.

(SEAL)
Attest:

ERNEST W. SWIDER                          EDWARD J. BRENNER
Attesting Officer                              Commissioner of Patents